United States Patent
Leone et al.

(10) Patent No.: US 10,989,272 B1
(45) Date of Patent: Apr. 27, 2021

(54) ENGINE SYSTEM AND METHOD FOR PENDULUM DAMPING

(71) Applicant: Ford Global Technologies, LLC, Dearborn, MI (US)

(72) Inventors: Thomas G. Leone, Ypsilanti, MI (US); Jeffrey Eliot Chottiner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/711,135

(22) Filed: Dec. 11, 2019

(51) Int. Cl.
| | |
|---|---|
| *F16F 15/26* | (2006.01) |
| *F16F 15/14* | (2006.01) |
| *F02D 13/06* | (2006.01) |
| *F02D 13/02* | (2006.01) |
| *F16F 15/28* | (2006.01) |

(52) U.S. Cl.
CPC .......... *F16F 15/26* (2013.01); *F02D 13/0203* (2013.01); *F02D 13/06* (2013.01); *F16F 15/145* (2013.01); *F16F 15/286* (2013.01); *F02D 2200/0404* (2013.01); *F02D 2200/101* (2013.01); *F02D 2200/602* (2013.01)

(58) Field of Classification Search
CPC ........ F16F 15/26; F16F 15/145; F16F 15/286; F02D 13/0203; F02D 2200/0404; F02D 2200/101; F02D 2200/602; F02D 13/06
See application file for complete search history.

(56) References Cited

U.S. PATENT DOCUMENTS

| | | | |
|---|---|---|---|
| 9,068,617 B2 | 6/2015 | Pietron et al. | |
| 9,546,706 B2 | 1/2017 | Jain | |
| 9,599,188 B2 | 3/2017 | Dogel et al. | |
| 2003/0221653 A1* | 12/2003 | Brevick | F02B 75/22 123/192.2 |
| 2009/0007877 A1* | 1/2009 | Raiford | F02D 15/00 123/192.1 |
| 2017/0335937 A1* | 11/2017 | Depraete | F16H 45/02 |

FOREIGN PATENT DOCUMENTS

| | | |
|---|---|---|
| DE | 102016222468 A1 | 5/2018 |
| EP | 2833018 A1 | 2/2015 |
| WO | 2018222994 A1 | 12/2018 |

* cited by examiner

*Primary Examiner* — Jacob M Amick
(74) *Attorney, Agent, or Firm* — Geoffrey Brumbaugh; McCoy Russell LLP

(57) ABSTRACT

Methods and systems for adjusting a tuning state of a pendulum damper are provided. In one example, an engine system is provided that includes a crankshaft coupled to a plurality of pistons in a plurality of cylinders. The crankshaft includes a plurality of pendulums coupled to a plurality of cheeks and a pendulum tuning mechanism coupled to an associated pendulum included in the plurality of pendulums or coupled to an associated pendulum in a torque converter and configured to tune damping characteristics of the associated pendulum based on an engine order.

20 Claims, 8 Drawing Sheets

ENGINE SYSTEM AND METHOD FOR PENDULUM DAMPING

FIELD

The present description relates generally to methods and systems for damping crankshaft vibrations.

BACKGROUND/SUMMARY

Engine crankshafts oscillate during combustion operation. Devices such as pendulum dampers (also known as pendulum vibration absorbers, pendulum absorbers, and centrifugal pendulum absorbers) dampen torsional vibrations emanating from the crankshaft, thereby reducing noise, vibration, and harshness (NVH) in the engine. For instance, the dampers may be included in a transmission torque converter, in one embodiment, or coupled to crankshaft cheeks, in other embodiments. Certain engine designs have also utilized cylinder deactivation technology, affecting the crankshaft's vibrational frequencies. However, previous pendulum dampers do not possess the adaptability to dampen the different oscillations (e.g., engine orders) occurring during both partial and full cylinder operation modes in variable displacement engines (VDEs). Thus, previous pendulum dampers have made tradeoffs with regard to selecting the pendulum's attenuation characteristics to suit either partial or full cylinder operation modes. For instance, the pendulum damper may be tuned to favor full cylinder operation (e.g., dampen vibrations of engine order in full cylinder operation mode), due to its more frequent usage, in certain scenarios.

One example approach for damping crankshaft vibration is shown by Pietron in U.S. Pat. No. 9,068,617 B2. Pietron discloses a crankshaft with a torsion-absorbing pendulum and a brake designed to augment the pendulum's travel limit based on crankshaft speed. The inventors, however, have recognized several drawbacks with Pietron's pendulum. The braking unit in the pendulum is not controllable during engine operation. Consequently, the pendulum is not capable of dynamic adjustment during, for example, transient conditions. As such, augmentation of Pietron's pendulum damping is not possible in engines deploying variable displacement technology.

The inventors have recognized the abovementioned drawbacks and developed an engine system to overcome at least a portion of the drawbacks. The engine system includes a crankshaft coupled to a plurality of pistons in a plurality of cylinders. The crankshaft includes a plurality of pendulums coupled to a plurality of cheeks. The crankshaft also includes a pendulum tuning mechanism coupled to one of the crankshaft pendulums or a pendulum included in a torque converter and configured to adjust damping characteristics of the associated pendulum based on an engine order. In this way, pendulum damping can be augmented to dampen a variety of engine orders. For instance, the tuning mechanism may be operated such that torque converter slip is reduced when cylinders are deactivated and when all the cylinders are activated the lug threshold may be reduced when the engine is operating at higher loads.

As one example, the engine system may include a controller designed to operate the pendulum tuning mechanism for adjustment of the damping characteristic of the associated pendulum responsive to deactivating a portion of the plurality of cylinders. It will be appreciated that the engine order changes when the cylinders are deactivated. In this way, pendulum tuning is dynamically adjusted based on changes in cylinder activation/deactivation to achieve additional NVH reductions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for dynamic pendulum damper tuning in an engine system. To elaborate, an engine system is provided with a pendulum tuning mechanism designed to change the tuning order of the pendulum. The tuning order adjustment allows vibrations at specific engine orders to be dampened. Thus, different engine orders occurring in variable displacement engine (VDE), for instance, may each be dampened. At least four ways of changing the pendulum tuning order have been envisioned. In the first pendulum tuning mechanism configuration, the mechanism varies the mass of the pendulum. In the second pendulum tuning mechanism configuration, the center of gravity of the pendulum is adjusted. In the third pendulum tuning mechanism configuration, a diameter of a rolling pin, serving as an interface between the pendulum and a carrier, is adjusted to vary pendulum tuning order. In the fourth pendulum tuning mechanism configuration, the mechanism is designed with multiple selectable arcuate openings for the rolling pin. As such, the rolling pins are axially adjusted to allow for pin engagement/disengagement between the different paths in the fourth configuration. Allowing for tuning order adjustability in the engine system enables the engine to lug at a lower speed without increased noise vibration and harshness (NVH) to improve fuel economy, if desired.

Figure 1:
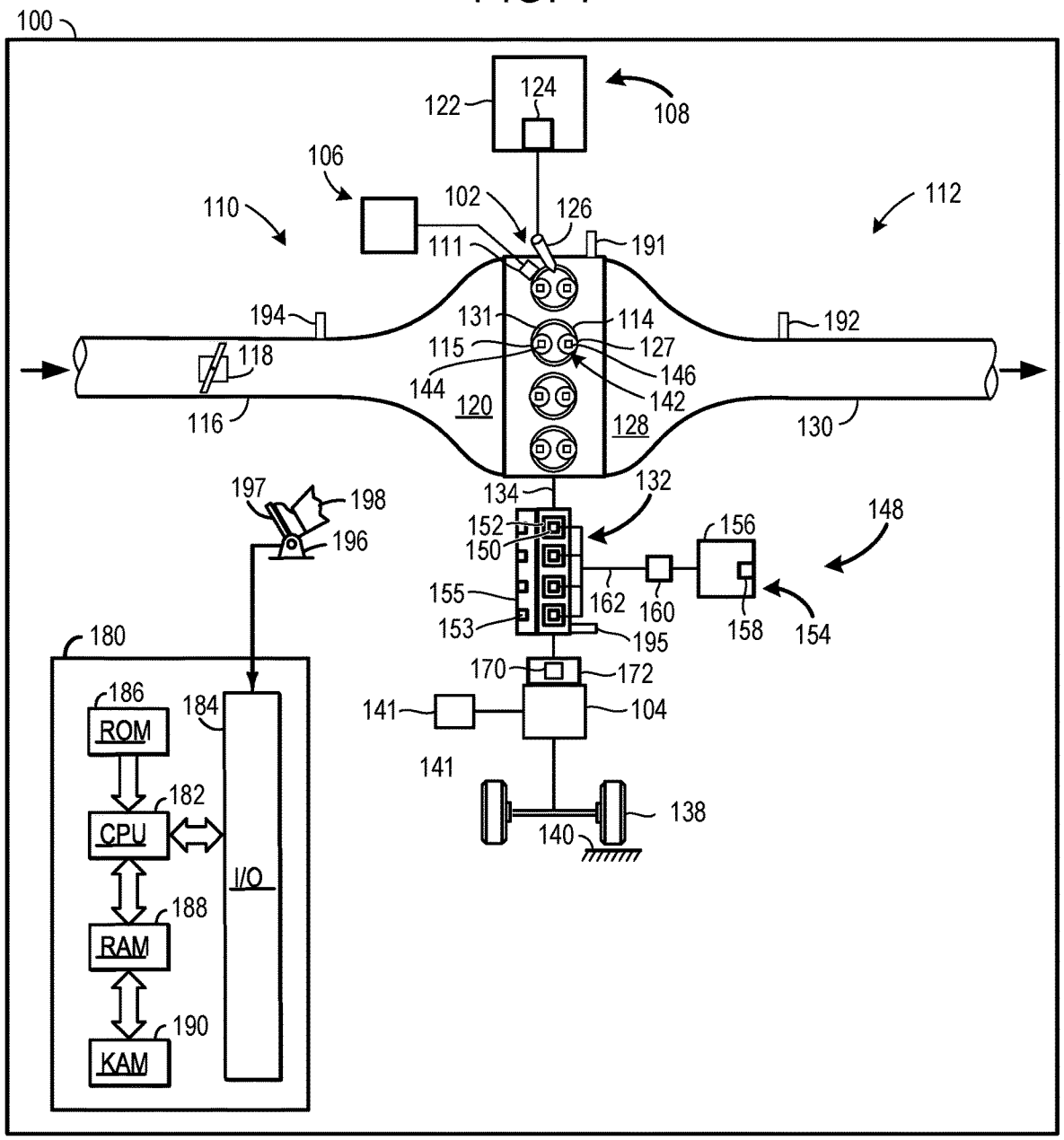
FIG. 1 is a schematic depiction of a vehicle with an engine including a pendulum tuning system.
Figure 2:
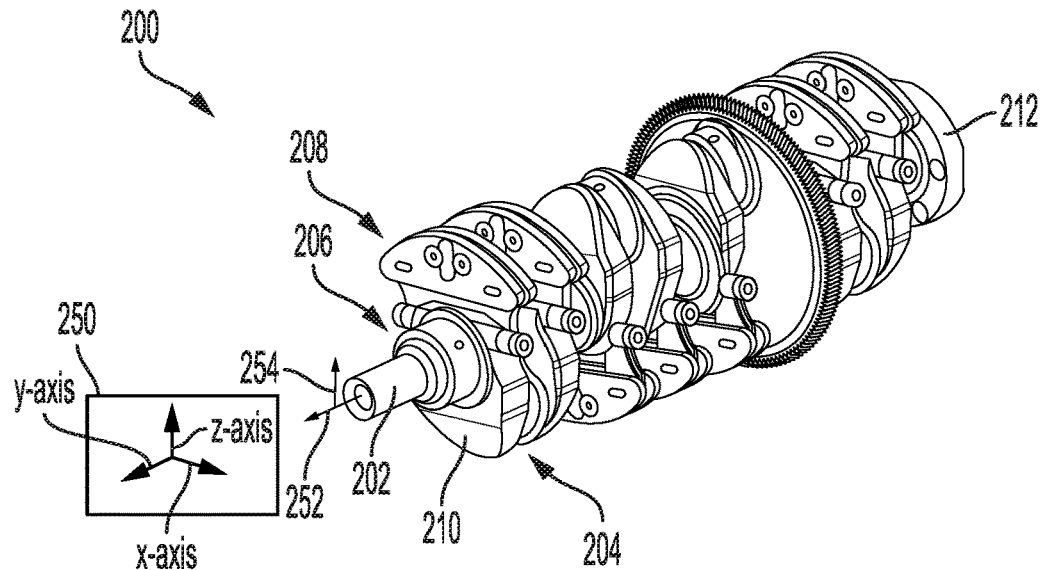
FIG. 2 is an illustration of an example of a crankshaft.
Figure 3:
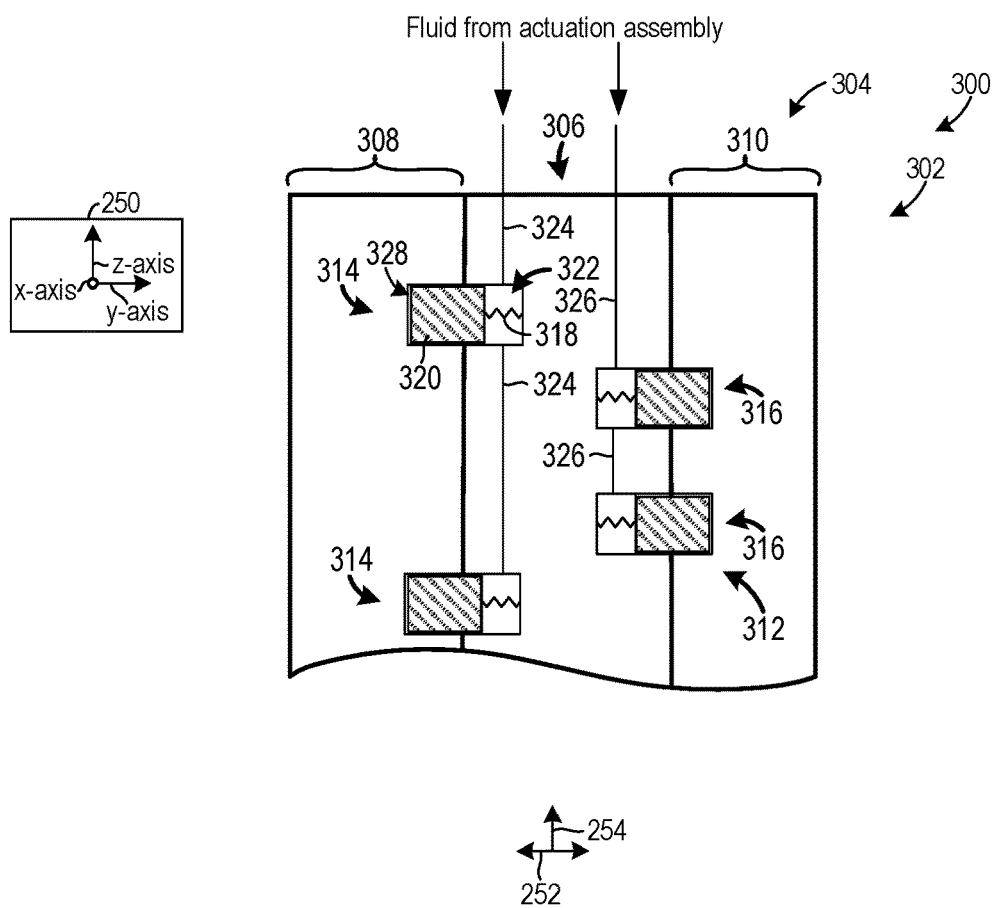
FIG. 3 shows a cross-sectional view of a first example of a pendulum tuning system.
Figure 4:
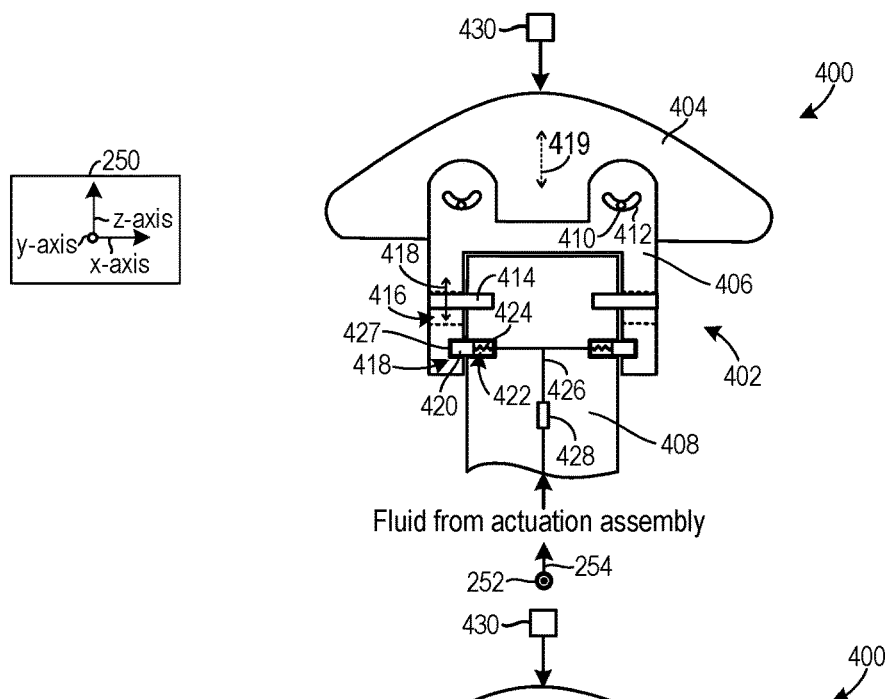
FIGS. 4-6 show different views of a second example of a pendulum tuning system.
Figure 5:
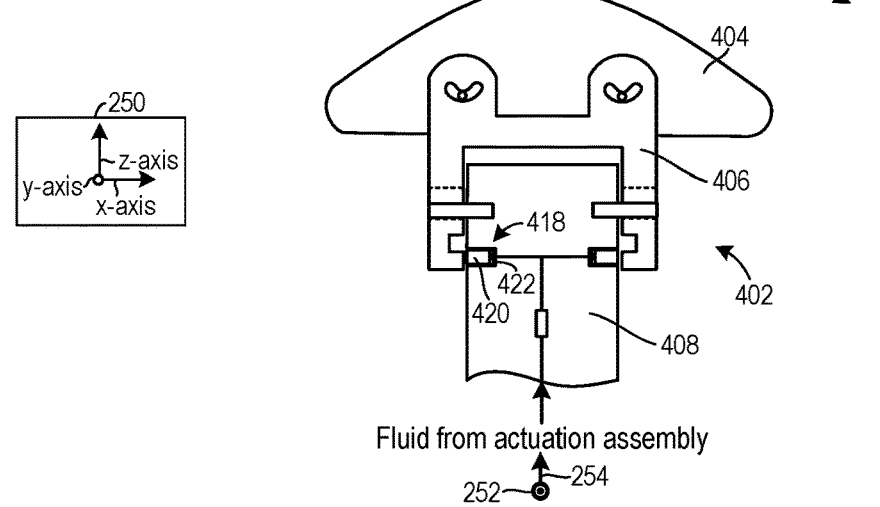
Figure 6:
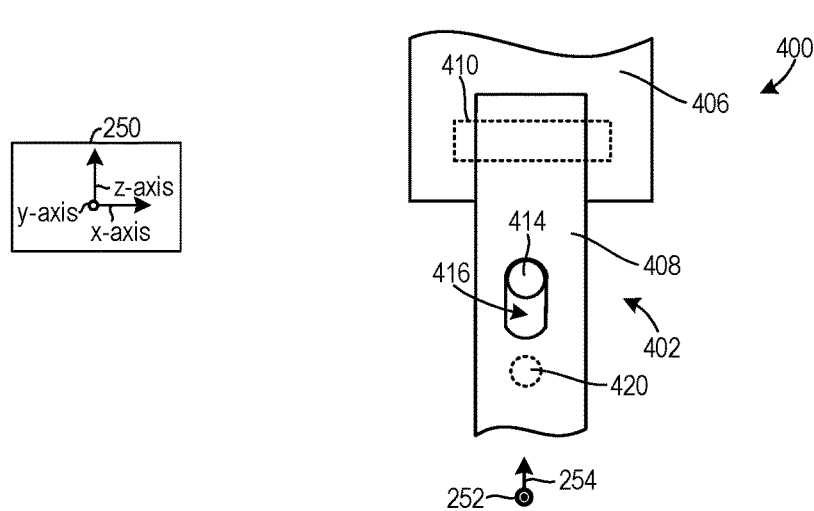
Figure 7:
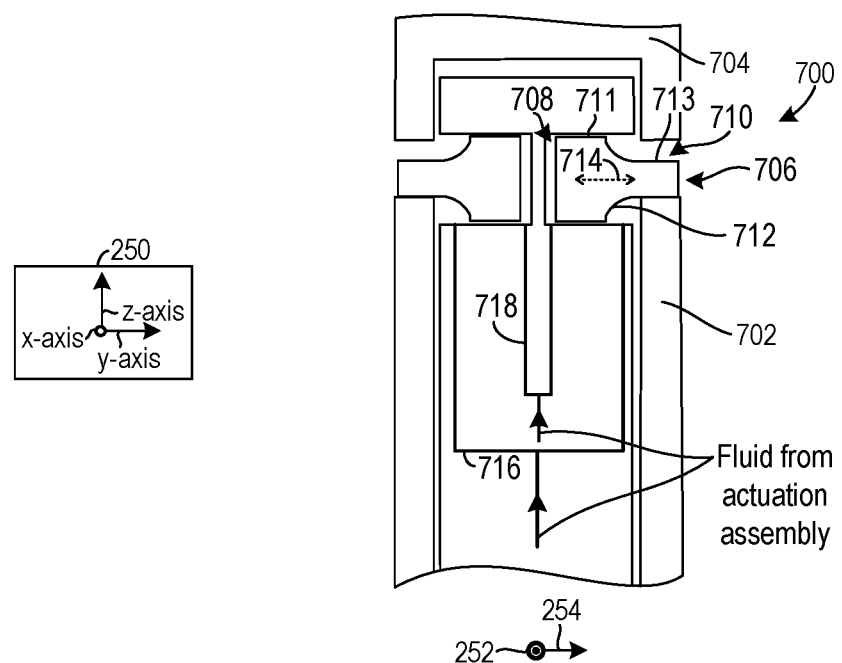
FIG. 7 shows a third example of a pendulum tuning system.
Figure 8:
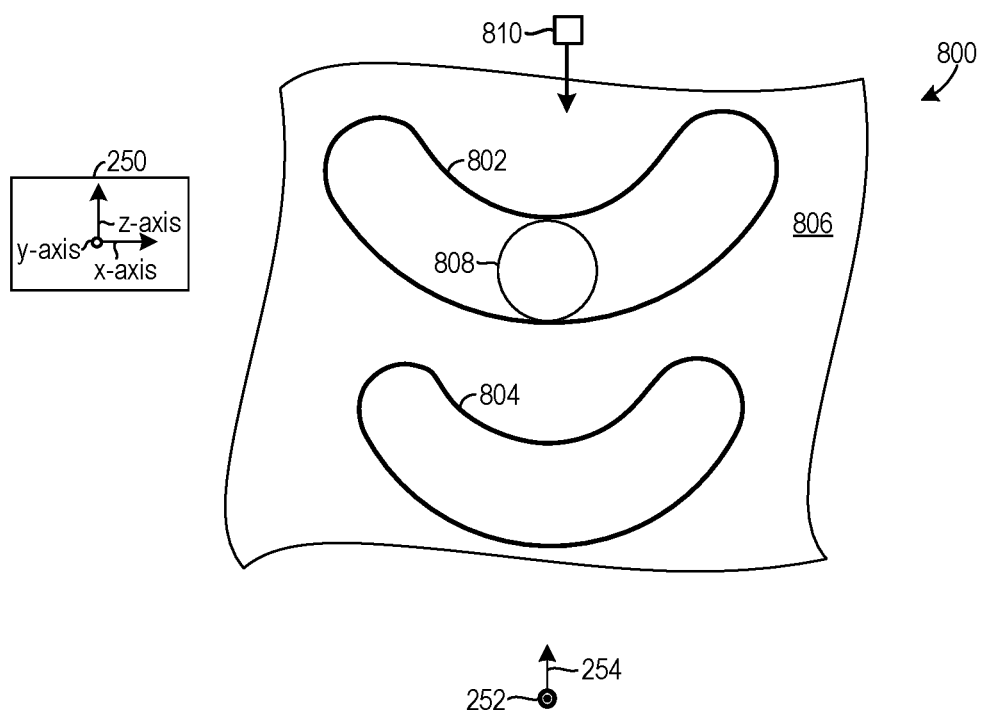
FIGS. 8-9 show a fourth example of a pendulum tuning system.
Figure 9:
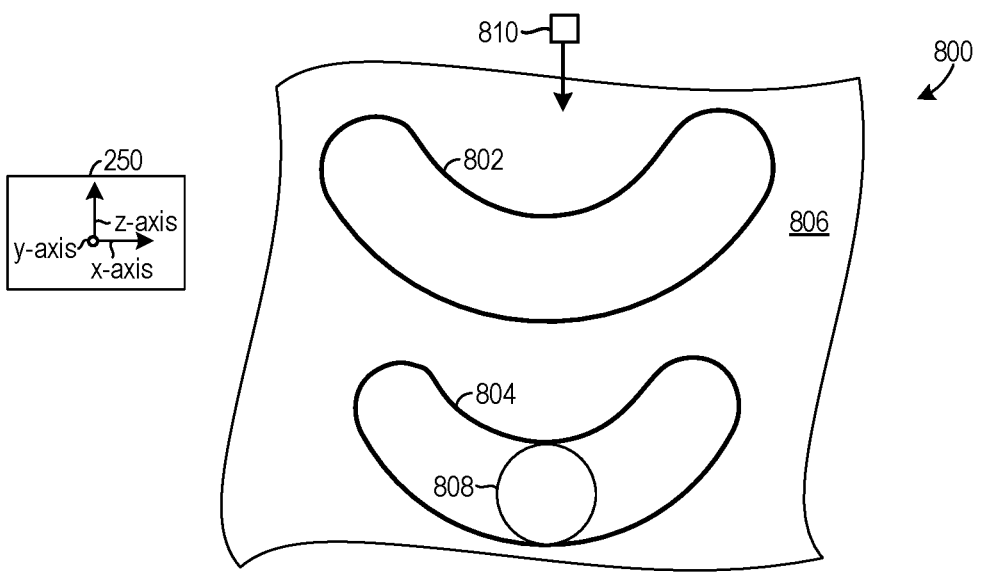
Figure 10:
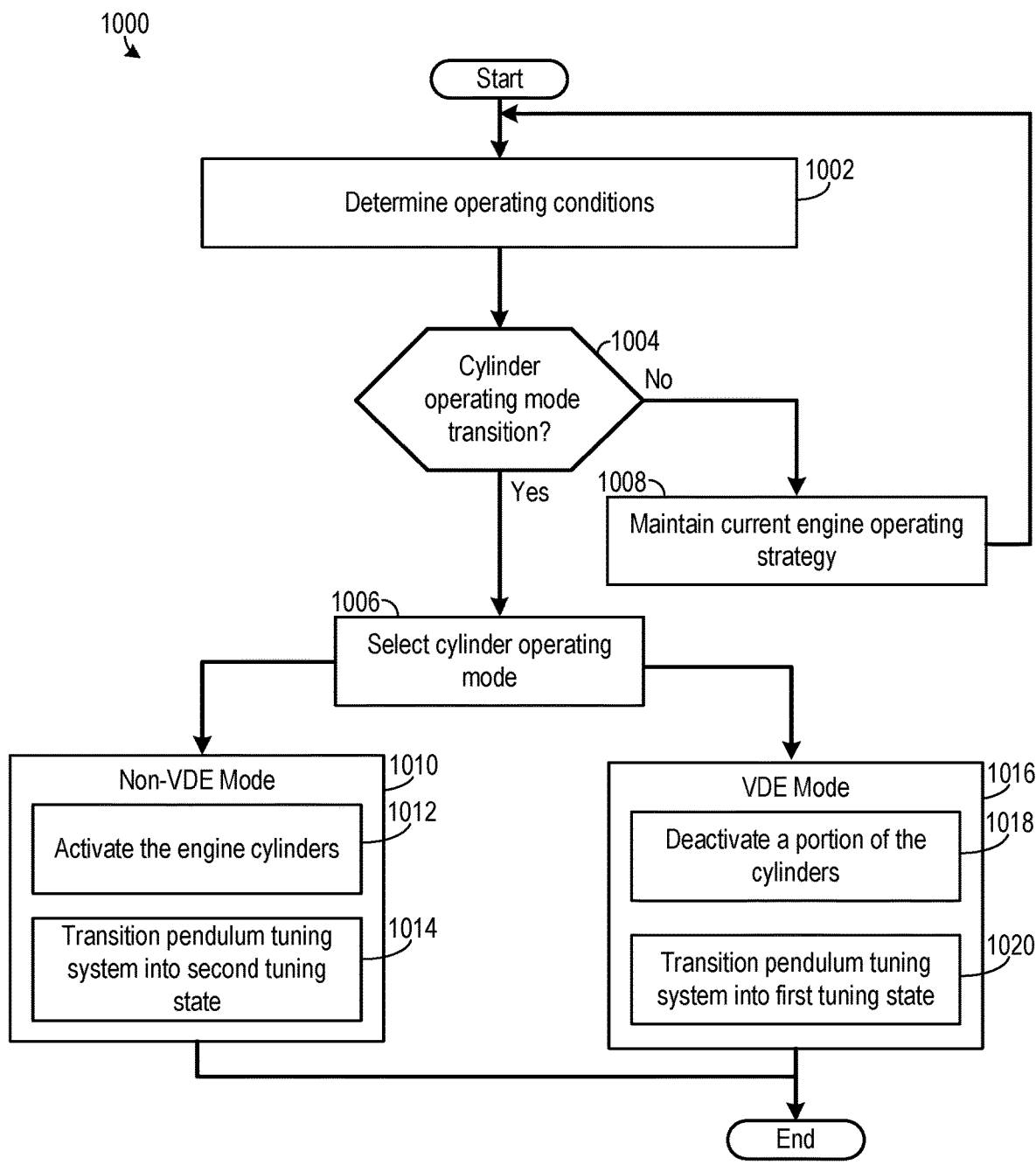
FIG. 10 shows a method for operation of a pendulum tuning system.
Figure 11:
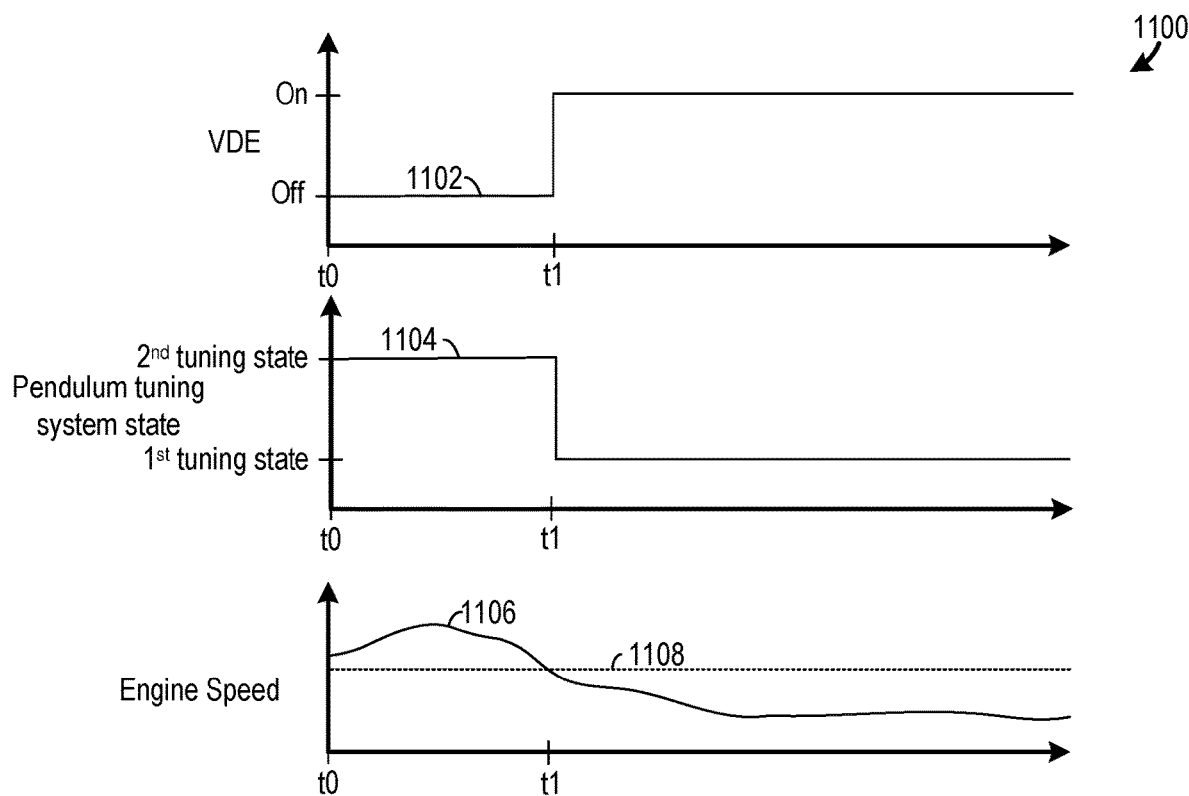
FIG. 11 illustrates a use-case timing diagram for a pendulum tuning system operating method.
Figure 12:
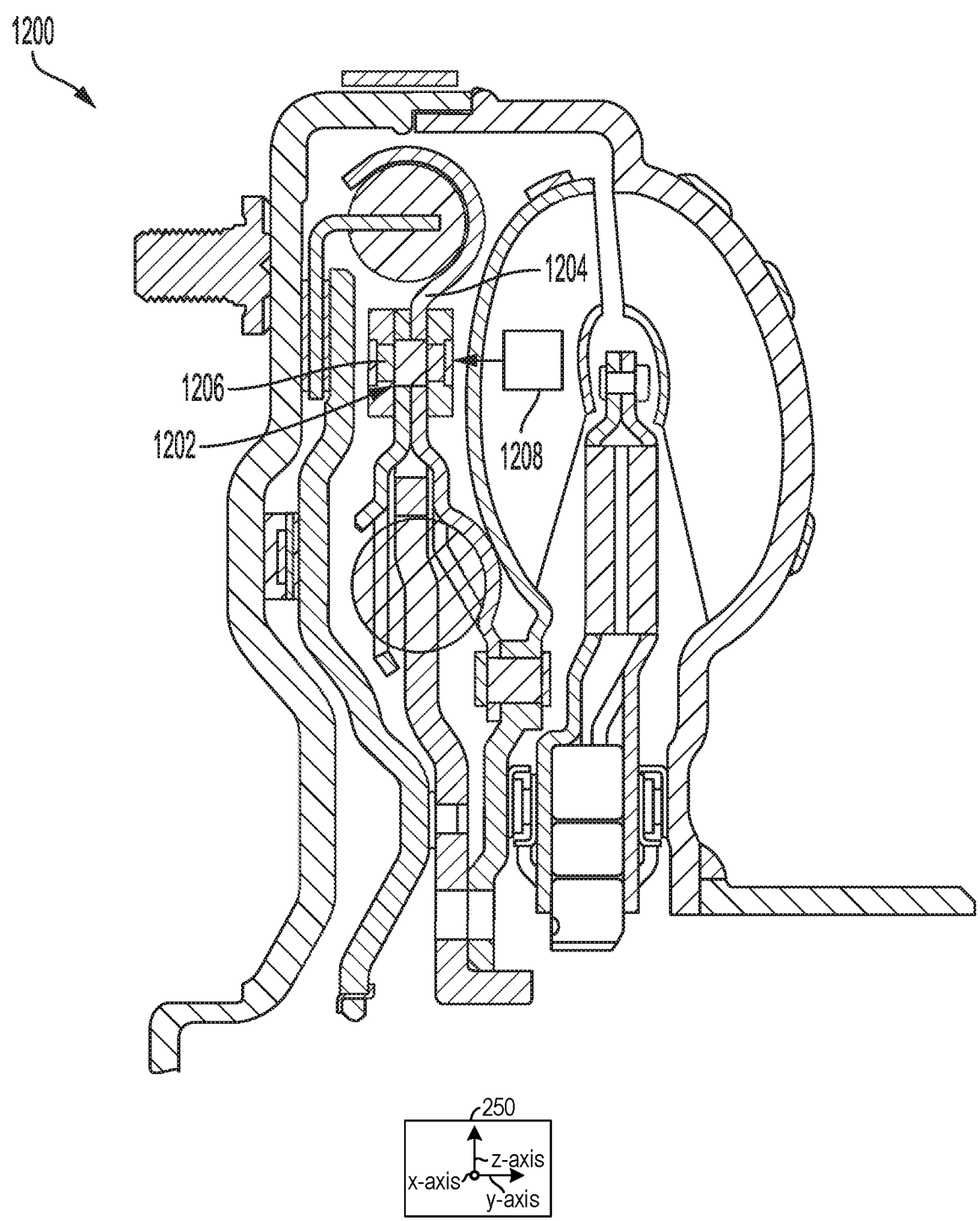
FIG. 12 shows an example of a torque converter with a pendulum tuning mechanism.

FIG. 1 illustrates a schematic depiction of a vehicle including an engine system with adjustable pendulum damping functionality. FIG. 2 shows an example of a crankshaft with pendulum dampers. FIG. 3 shows a first example of a pendulum tuning system with a pendulum tuning mechanism designed to adjust the mass of the pendulum. FIGS. 4-6 show different views of a second example of a pendulum tuning system with a pendulum tuning mechanism having locking pins designed to adjust the pendulum's center of gravity. FIG. 7 shows a third example of a pendulum tuning mechanism with stepped rolling pins. FIGS. 8-9 show a fourth example of a pendulum tuning mechanism with adjustable rolling pins. FIG. 10 shows a method for operation of a pendulum tuning system. FIG. 11 shows a graphical representation of a use-case pendulum tuning system control strategy. FIG. 12 shows an example of a torque converter with a pendulum tuning mechanism.

Referring now to FIG. 1, a schematic depiction of a vehicle 100 is shown. The vehicle 100 includes an engine 102, transmission 104, a fuel delivery system 108, an intake system 110, and an exhaust system 112. The vehicle 100 may also include an ignition system 106, in one example. However, the engine may additionally or alternatively be configured to perform compression ignition.

The intake system 110 provides intake air to cylinders 114 in the engine 102. During engine operation, the cylinders 114 may undergo a four-stroke cycle including an intake stroke, compression stroke, expansion stroke, and exhaust stroke. Thus, the cylinder generates motive energy for the vehicle. Although, a plurality of engine cylinders are illustrated in FIG. 1, it will be appreciated that the engine 102 may include an alternate number of cylinders, such as a single cylinder. The intake system 110 includes an intake conduit 116 and throttle 118 positioned therein to allow for adjustments in the flowrate of intake air provided to the cylinders 114. The throttle 118 may include a plate, pivot, and/or other suitable mechanical components to allow for intake airflow adjustment. The intake system 110 further includes an intake manifold 120 in fluidic communication with the cylinders 114. The intake system 110 may include intake valves 115 selectively providing intake air to the cylinders as well as other components, enabling air to be delivered to the cylinders.

The fuel delivery system 108 is designed to deliver metered amounts of fuel to cylinders 114 in the engine 102 and includes a fuel storage tank 122 and a fuel pump 124. The fuel delivery system 108 also includes an injector 126 providing fuel to the cylinders and receiving fuel from the fuel pump 124. While a single injector is shown, injectors may be provided for each cylinder. The injector is illustrated as a direct injector in FIG. 1. However, it will be understood that port fuel injector(s) injecting fuel into the intake system upstream of the intake valves (not shown), may additionally or alternatively be included in the fuel delivery system 108.

The ignition system 106 includes an ignition device 111 (e.g., spark plug) coupled to one of the cylinders 114. Additionally or alternatively the engine may be designed to implement compression ignition. Although, only one ignition device is shown in FIG. 1 it will be appreciated that at least one ignition device may be provided in the ignition system per cylinder. The engine 102 (e.g., the ignition system 106 and/or fuel delivery system 108) may be designed to initiate combustion in selected cylinders. For instance, in a deactivation mode (e.g., VDE mode) combustion operation may only take place in a portion of the cylinder per one crank revolution. Conversely, in active mode (e.g., non-VDE mode) combustion may be performed in all of the engine cylinder per one crank revolution. As such, the engine may experience different orders, during operation. Engine order refers to a vibrational pattern of the engine. For instance, when four cylinders are active, the engine order is a second order and when two cylinders are active, the engine order is a first order. As described in greater detail herein, the pendulums can be tuned to different engine orders to reduce the fluctuating torque caused by these orders.

The exhaust system 112 is designed to receive exhaust gas from the cylinders 114 through exhaust valves 127. The exhaust system 112 includes an exhaust manifold 128, an exhaust conduit 130, as well as other components to achieve this functionality. It will be appreciated that the exhaust manifold 128 may be in fluidic communication with exhaust valves 127. The exhaust system 112 may also include an emission control device (not shown) for reducing tailpipe emissions which may include catalysts, filters, combinations thereof, etc., to reduce emissions.

Pistons 131 are positioned in the cylinders 114. Reciprocal motion of the pistons 131 may be transferred to a crankshaft 132 via rods and/or other suitable mechanical components indicated at 134.

The crankshaft 132 is rotationally coupled to the transmission 104. The transmission 104 may include a gear assembly designed to adjust the rotational speed output from the transmission 104 to the drive wheels 138. Thus, the transmission 104 may transfer motive power to drive wheels 138. In turn, the drive wheels 138 contact a driving surface 140, enabling the vehicle to travel along a desired path.

A valve deactivation system 142 may also be included in the engine 102. The valve deactivation system may be configured to deactivate one or more of the intake valves 115 and/or one or more of the exhaust valves 127. The valve deactivation system 142 includes intake valve activation/deactivation devices 144 as well as exhaust valve activation/deactivation devices 146, in the illustrated example. However, in other examples, the valve deactivation system may include only intake or exhaust valve activation/deactivation devices, in other examples. It will also be understood that in other examples, only a portion of the intake and/or exhaust valves may include activation/deactivation devices, in other examples. The valve deactivation system may include pushrod type deactivation devices, overhead cam type deactivation devices, electromagnetic deactivation devices, etc., for instance. As such, the valve deactivation system may include cam adjustment devices, solenoids, push rods, lifters, locking pins, rocker arms, electromagnetic devices, etc., to accomplish the aforementioned valve activation and deactivation functionality.

The vehicle 100 shown in FIG. 1 may be a hybrid vehicle, in some embodiments. In such an embodiment, the vehicle includes multiple sources of torque available to the drive wheels 138. For example, a motor-generator 141 may provide torque to and/or receive torque from the transmission or other suitable location in the powertrain. The powertrain may be designed with a variety of hybrid configurations, such as parallel hybrid configurations, series hybrid configurations, etc.

A pendulum tuning system 148 is also provided in the engine 102. The pendulum tuning system 148 may include components in the crankshaft 132 as well as components external to the crankshaft, designed to induce adjustment of the tuning characteristics of crankshaft pendulums. For instance, the pendulum tuning system 148 may be operated in different tuning orders, each tuning order corresponding to a different engine order.

In the illustrated embodiment, the pendulum tuning system 148 specifically includes pendulum tuning mechanisms 150 each coupled to a crank cheek 152, commonly referred to as webs, in the crankshaft 132. To elaborate, the number of pendulum tuning mechanisms 150 may correspond to the number of cylinders in the engine, in one example. However, in other examples, there may be a different (e.g., fewer) number of pendulum tuning mechanisms than cylinders in the engine. Still further in other examples, the pendulum tuning mechanisms may be adjustably coupled to pendulums 170 in a torque converter 172 of the transmission 104. The torque converter 172 serves as a fluid coupling between the engine crankshaft and transmission components.

In one example, each of the pendulum tuning mechanisms 150 may be jointly adjusted during a single crankshaft rotation to place the mechanisms in a selected tuning state corresponding to different engine tuning orders. For instance, the pendulum tuning mechanisms 150 may be cooperatively placed in a second order state or a first order state, in the case of a four-cylinder engine use-case example. In an eight-cylinder engine use-case example, the tuning mechanisms may be cooperatively placed in a fourth order state or a second order state. In some embodiments, adjustable ramps 153 may be provided in an oil pan 155 to push the pendulums in the pendulum tuning system towards the axis of crankshaft rotation. The functionality of the ramps is discussed in greater detail herein. It will be appreciated that the crankshaft 132 may be coupled to the pistons 131 via suitable mechanical devices such as piston rods.

The pendulum tuning system 148 may further include an actuation assembly 154. The actuation assembly 154 is hydraulically operated, in the illustrated example. However, electromagnetic actuation assemblies or pneumatic actuation assemblies may be used, in other examples. The actuation assembly 154 may include a fluid reservoir (e.g., oil reservoir) 156 and a fluid pump 158. The fluid pump 158 is designed to assist in fluid transport through the pendulum tuning system 148 and may include a variety of suitable components to accomplish the fluid transport functionality such as plungers, pumping chambers, vanes, lobes, rotors, etc. The fluid pump 158 is included in the fluid reservoir 156, in the depicted example. However, the pump may be positioned in a suitable location external to the reservoir, in other examples. Still further in other examples, additional pumps and/or valves may be provided in the pendulum tuning system to enable more granular adjustment of fluid flow in the system. The actuation assembly 154 may further includes a valve 160 designed to adjust the flowrate of fluid provided to the pendulum tuning mechanisms 150. Fluid pressure provided to the pendulum tuning mechanisms 150 adjusts the state of the pendulum tuning mechanisms 150. Fluid conduits 162 allows fluid to flow to the plurality of pendulum tuning mechanisms 150 from the valve 160.

The fluid conduits 162 may be routed through a central portion of the crankshaft, crank cheeks, pendulum carriers, pendulums, etc., to space efficiently supply fluid to the pendulum tuning mechanisms. For instance, in a pendulum tuning system designed for center of gravity adjustability (e.g., pendulum tuning system 400 shown in FIGS. 4-6) oil may be routed through crankshaft mains through the cheeks to the locking pins in the cheeks. In other system designs, such as the pendulum tuning system 300 shown in FIG. 3, an annulus may be provided to between the cheeks and the inner pendulum to supply fluid to the locking pins. Still further in other system designs, such as the systems shown in FIGS. 7-9, oil may be routed through the pendulum carrier to the rolling pin path and not through the pendulums, in some cases.

It will be appreciated that the fluid routing and/or valving in pendulum tuning system may have greater complexity than is captured in FIG. 1. Therefore, it will be understood that the actuation assembly 154 may include additional fluid conduits and/or valves directing and/or regulating the flow of fluid to different lines in the pendulum tuning mechanisms 150 to adjust the operational state of the mechanisms. It will also be appreciated that in each damper embodiment, the damper systems may receive oil from the engine lubrication system configured to lubricate engine components such as the pistons 131, camshafts, etc. Therefore the fluid reservoir 156 may be an oil pan or receive oil from an oil pan. Using oil from the engine lubrication system for pendulum tuning system adjustment allows the complexity and therefore cost of the engine to be reduced. In some examples, fluid pressure in the engine lubrication system and actuation assembly 154 may be independently adjustable. However, in other examples, the fluid pressure in the engine lubrication system may be used to adjust the actuation assembly 154.

FIG. 1 also shows a controller 180 in the vehicle 100. Specifically, controller 180 is shown in FIG. 1 as a conventional microcomputer including: microprocessor unit 182, input/output ports 184, read-only memory 186, random access memory 188, keep alive memory 190, and a conventional data bus. Controller 180 is configured to receive various signals from sensors coupled to the engine 102. The sensors may include engine coolant temperature sensor 191, exhaust gas sensors 192, an intake airflow sensor 194, engine speed sensor 195, etc. Additionally, the controller 180 is also configured to receive a pedal position from a pedal position sensor 196 coupled to a pedal 197 actuated by an operator 198. The pedal adjustment may trigger a corresponding adjustment of the position of the throttle 118.

The controller 180 may be configured to trigger one or more actuators and/or send commands to components. For instance, the controller 180 may trigger adjustment of the throttle 118, the intake valve activation/deactivation devices 144, exhaust valve activation deactivation devices 146, the fuel delivery system 108, the ignition system 106, the pendulum tuning system 148, etc. For instance, the controller may send a command signal to the throttle to adjust an actuator therein causing movement (e.g., rotation) of a throttle plate. The other components receiving command signals from the controller may function in a similar manner. Therefore, the controller 180 receives signals from the various sensors and employs various actuators to adjust engine operation based on the received signals and instructions stored in memory of the controller.

In another example, the controller 180 may be configured to place the engine in various operation modes. For instance, in a cylinder deactivation mode (e.g., VDE mode) a portion of the cylinders 114 may be deactivated. When deactivated, the cylinders are not performing combustion. As such, deactivation of the cylinders may involve preventing fuel injection into the cylinders, inhibiting valve (e.g., intake and/or exhaust valve) actuation in the cylinders, and/or preventing spark from being delivered to the cylinders. For instance, the interior cylinders may be deactivated.

Engine speed and/or load may be used to determine when to activate and deactivate selected engine cylinders. For instance, when the engine speed and/or the engine load fall below threshold value(s), the engine may be transitioned to the VDE mode where a portion of the cylinders 114 are deactivated, as previously mentioned. Deactivating the cylinders may include closing the intake and/or exhaust valve by operating the corresponding valve activation/deactivation devices and/or suspending fuel injection and/or ignition in the selected cylinder(s) by operating the fuel delivery system 108 and/or the ignition system 106. It will be understood that engine order may change in response to cylinder activation/deactivation.

The controller 180 may also be configured to operate the pendulum tuning system 148 in various operating modes. For instance, in a first tuning mode the plurality of pendulum tuning mechanisms 150 may be configured to dampen vibrations occurring during the cylinder deactivation mode. Continuing with such an example, in a second tuning mode the plurality of pendulum tuning mechanisms 150 may be configured to dampen vibrations occurring during the full cylinder mode. It will be understood that the first tuning mode is distinct from the second tuning mode. The adjustments in damping characteristics between the modes may be achieved via adjustments in the pendulum mass, pendulum center of gravity, rolling pin diameter, and/or the pendulum path. Different schemes for adjustments in damping characteristics of the pendulums in the different tuning modes are discussed in greater detail herein with regard to FIGS. 10 and 11.

FIG. 2 shows a detailed view of an example of a crankshaft 200. The crankshaft 200 includes a rotational shaft 202, crankpins 204, main journals 206, and pendulums 208 that could be made adjustable the pendulum tuning system described herein. The pendulums 208 may function to dampen oscillations. The pendulums 208 also serve as counterweights for the main journals 206. The crankshaft 200 may also include cheeks 210 extending between the pendulums 208 and the crankpins 204. The pendulums 208 may be part of a pendulum tuning system, such as the pendulum tuning system 148 shown in FIG. 1. As such, the adjustable pendulums may have pendulum tuning mechanisms integrated therein or coupled thereto, such as the pendulum tuning mechanisms 150 shown in FIG. 1. It will also be understood that the pendulums 208 are illustrated in FIG. 2 to convey a general layout of the pendulums in the crankshaft. However, the exact structure and function of pendulums utilized in the pendulum tuning system may vary. Different embodiments of tuning systems are shown in FIGS. 3-9 and 12 and discussed in greater detail herein. It will be understood however that the pendulum tuning systems described herein with regard to FIGS. 3-9 may be included in the crankshaft 200, in combined embodiments.

Additionally, the main journals 206 function as connection points for crankshaft bearings (not shown). When the crankshaft is assembled in an engine, the crankpins 204 may be coupled to engine pistons, such as the pistons 131 depicted in FIG. 1, via piston rods. A mounting flange 212 in the crankshaft 200 is also depicted in FIG. 2. The mounting flange 212 may be designed to attach to a flywheel, flexplate, etc. Thus, the mounting flange may serve as an attachment interface for the transmission. The crankshaft 200 shown in FIG. 2 includes four crankpins and therefore is designed for a four cylinder engine. However, crankshafts for engines have an alternate number of cylinders have been envisioned.

An axis system 250 is provided in FIG. 2 as well as FIGS. 3-9 and 12 to establish a common frame of reference between the figures. The axis system 250 includes an x-axis, a y-axis, and a z-axis. The x-axis may be a lateral axis, the y-axis may be a longitudinal axis, and/or the z-axis may be a vertical axis. However, the axes may have other orientations in different embodiments. Additionally, a rotational axis 252 of the crankshaft 200 is also provided in FIG. 2 as well as FIGS. 3-9 and 12 for reference. As shown, the rotational axis 252 may be parallel to the y-axis. A radial direction 254 is also provided for reference. It will be understood that a radial direction is any direction perpendicular to the rotational axis.

FIG. 3 shows an embodiment of an example of a pendulum tuning system 300. It will be understood that the pendulum tuning system 300, shown in FIG. 3 is an example of the pendulum tuning system 148, shown in FIG. 1. Therefore, the tuning system 300 shown in FIG. 3 and/or the other tuning system embodiments described herein may include structural and/or functional aspects of tuning system 148 shown in FIG. 1 or vice versa.

The pendulum tuning system 300 shown in FIG. 3 includes a pendulum tuning mechanism 302 having a plurality of pendulums 304. The pendulums are sequentially arranged along a longitudinal axis parallel to the axis of rotation 252 of the crankshaft or other component to which they are attached (e.g., rotational plate in the torque converter embodiment). To elaborate, the pendulums include an inner pendulum 306, a first outer pendulum 308, and a second outer pendulum 310. It will be appreciated that the inner pendulum mass 306 may be continuously moving on the crankshaft. The outer masses 308 and 310, on the other hand, may be operable in a decoupled mode (stationary state) as well as coupled mode where the outer pendulums are coupled to and moving with the inner pendulum 306. In this way, the tuning order of the system is altered via an adjustment of pendulum rotational mass. Thus, in the coupled mode the corresponding outer pendulum is attached to and moving with the inner pendulum. Conversely, in the decoupled mode, the corresponding outer pendulum is detached from the inner pendulum and therefore may be relatively stationary. It will be understood that the outer pendulums may be supported by the crankshaft, in some embodiment, while retaining the rotational decoupling functionality. It will be understood that once the pins in the inner pendulum 306 are activated and attach one or both of the outer pendulums 308, 310 to the inner pendulum 306 the tuning order of the system is changed. As such, the system may exhibit at least three tuning orders. In a first use-case tuning order, the inner pendulum 306 is the sole pendulum moving on the crankshaft. In a second use-case tuning order, one of the outer pendulums 308, 310 is coupled to and moving with the inner pendulum 306. In a third use-case tuning order, both of the other pendulums 308, 310 are coupled to and moving with the inner pendulum 306. It will be understood that the system may exhibit four distinct tuning orders if the outer pendulums have unequal masses.

To achieve mass change of the rotating pendulum arrangement and corresponding tuning order adjustment, the pendulum tuning mechanism 302 may further include a plurality of hydraulically adjustable locking pin devices 312. Specifically, a first set of locking pin devices 314 may be provided to enable coupling and decoupling between the inner pendulum 306 and the first outer pendulum 308 and a second set of locking pin devices 316 may be provided to enable coupling and decoupling between the inner pendulum and the second outer pendulum 310. Each of the locking pin devices include a spring 318 attached to a locking pin 320 residing in a locking pin recess 322 in the inner pendulum 306. A first fluid conduit 324 and a second fluid conduit 326 routes fluid to the different locking pin recesses. The fluid conduits receive fluid from an actuation assembly, such as the actuation assembly 154, shown in FIG. 1. For instance, valves in the actuation assembly may be configured to adjust (e.g., independently adjust) the flowrate of fluid through the first fluid conduit 324 and the second fluid conduit 326. Thus, the first fluid conduit 324 may be fluidly coupled to an associated valve (e.g., valve 160, shown in FIG. 1) and the second fluid conduit 326 may be fluidly coupled to another valve. Increasing fluid pressure in the recesses 322 in the inner mass 306 moves the locking pin 320 toward a corresponding outer pendulum to mate with a recess 328 therein. Conversely, decreasing fluid pressure in the recesses 322 in the inner pendulum 306 moves the locking pin 320 back into the inner pendulum via a spring force. In this way, the locking pin devices 314 can couple and decouple the inner pendulum 306 from both the outer pendulums 308 and 310, independently. As such, the mass of the pendulum assembly rotationally coupled to the crankshaft may be adjusted based on engine operating conditions. For instance, the mass of the pendulum tuning mechanism coupled to the crankshaft may be increased responsive to activation of a portion of the engine cylinders. Continuing with such an example, the mass of the pendulum tuning mechanism coupled to the crankshaft may be decreased responsive to deactivation of a portion of the engine cylinders.

It will be understood that tuning mechanisms with an alternate number of pins have been envisioned. For instance, the tuning mechanism may include two pins, in one example, or more than four pins, in another example. Furthermore, it will be understood that the tuning mechanism 302, shown in FIG. 3, may counterbalance one crankpin in a crankshaft. However, the crankshaft may include additional tuning mechanisms corresponding to the additional crankpins. In this way, a tuning mechanism may be provided for each piston. However, systems that include tuning mechanisms corresponding to a portion of the pistons have also been envisioned. Furthermore, the other tuning mechanism embodiments described herein may also be replicated for additional engine pistons and in some cases each piston in the engine.

As previously discussed, the inner pendulum 306 continuously moves on the crankshaft. However, with both sets of pins retract into the inner pendulum, only the inner pendulum oscillates with respect to the crankshaft. When pin 314 is activated and engaging outer pendulum 308, the inner and outer pendulum oscillates with respect to the crank and thereby changes the tuning order. The same can be done for the other outer pendulum 310. The pendulum tuning system may be placed in its different tuning orders in this manner. As mentioned above, in the first tuning order, the inner mass 306 oscillates with respect to the crankshaft. In a second tuning order, the first outer mass 308 or the second outer mass 310 and the inner mass 306 oscillates with respect to the crankshaft. In a third tuning order, the inner mass 306, the first outer mass 308, and the second outer mass 310 oscillate with respect to the crankshaft. In this way, the system can be adapted to dampen different engine orders based on engine operating conditions.

FIGS. 4-6 show different views of another example of a pendulum tuning system 400 including a pendulum tuning mechanism 402. It will be understood that the pendulum tuning mechanism 402 may be included in a crankshaft and positioned on a side of the crankshaft opposing a side of the shaft including a crankpin. Specifically, the pendulum tuning mechanism and the crankpin may be positioned on radial opposing sides of the crankshaft.

Turning specifically to FIG. 4, the pendulum tuning mechanism 402 includes a pendulum 404 attached to a carrier 406. The carrier 406 is adjustably attached (e.g., radially adjustably attached) to a crankshaft section 408.

Rolling pins 410 positioned in opening 412 (e.g., arcuate openings) in the carrier 406 and the pendulum 404 allow the pendulum to move during crankshaft rotation to dampen crankshaft vibrations. Specifically, the pins 410 and openings 412 reduce oscillating torque in the crankshaft. For instance, during operation, the crank experiences oscillating torque/motion corresponding to engine order. The pendulums (through the interaction between the pin and recess in the pendulums) move in directions opposing the oscillation to absorb and release energy to reduce oscillating torque.

The crankshaft section 408 is slidably attached to the carrier 406 via attachment pins 414 fixedly attached (e.g., welded, press fit, threading engagement, etc.) to the crankshaft section. The attachment pins 414 mate with slots 416 in the carrier 406. The slots 416 are sized to enable movement of the attachment pins and therefore the pendulum 404 in radial directions 419 with regard to the carrier 406.

The pendulum tuning mechanism 402 also includes locking pin devices 418 configured to couple/decouple the crankshaft section 408 from the carrier 406. The locking pin devices 418 each include a locking pin 420 residing in a locking pin recess 422 in the crankshaft section 408. A spring 424 is also shown coupled to the locking pin 420. Fluid lines 426 provides fluid to the locking pin recess 422. The fluid lines 426 may be coupled to an actuation assembly, such as the actuation assembly 154, shown in FIG. 1. As such, a valve may regulate the flow rate of fluid through the fluid lines 426. Fluid pressure in the fluid lines 426 may be increased to place the locking pins 420 in a locked configuration. A check valve 428 may also be coupled to the fluid lines 426. The check valve 428 can negate the need for a sustained flow of high-pressure fluid into the lines to maintain the locking pins in a locked configuration, if desired. Consequently, the likelihood of the locking pins becoming inadvertently unlocked can be reduced, if desired. FIG. 4 shows the pendulum tuning mechanism 402 in a first tuning state where the locking pin devices 418 fixedly couple the crankshaft section 408 to the carrier 406 to substantially fix the radial position of the crankshaft section and the carrier. Specifically, the locking pins 420 reside in recesses 427 in the carrier 406 when the pins are locked to place the mechanism in the first tuning state. Thus, in the first tuning state the pendulum 404 remain closer to the crankshaft's rotational axis 252. It will be understood, the pendulum tuning mechanism 402 may be placed in the first tuning state when the engine transitions into a VDE mode where a portion of the engine cylinders are deactivated. To elaborate, the tuning mechanisms associated with pistons in the deactivated cylinders may be placed into the first tuning state where the pendulum's center of gravity is brought closer to the crankshaft's rotational axis. Providing augmented vibration damping during the VDE mode can allow the engine, transmission, etc., to have lower NVH. Gear rattle in the transmission can be reduced, for instance. Consequently, a lower more efficient engine speed can be used without increasing NVH.

A ramp 430 is schematically indicated in FIGS. 4 and 5. It will be appreciated that engine centrifugal force causes the pendulum 404 to move from the pendulum state of FIG. 4 to the pendulum state of FIG. 5 without any additional energy input, for instance. However, when transitioning the pendulum from the state of FIG. 5 back to the state of FIG. 4, a force is needed to overcome the centrifugal force and push the pendulum closer to its axis of rotation. The ramp 430 therefore may be used to overcome the centrifugal force to allow the pendulum to transition the pendulum from a state with its center of gravity further away from the rotational axis to a state with its center of gravity closer to the rotational axis. To elaborate, the ramp 430 may have a sloped surface to push the pendulum closer to the crankshaft's rotational axis. The ramp 430 may be integrated into an oil pan, for example. Thus, the ramp 430 is designed to urge the pendulum 404 back to the position between the carrier and the crankshaft section 408 where the locking pins 420 can engage with the recesses 427 in the carrier to substantially lock the relative position of the carrier 406 and the crankshaft section 408. The ramp 430 may be radially or axially actuated into an active configuration where the ramp interacts with the pendulum during a crankshaft rotation or an inactive configuration where the ramp does not interact with pendulum. In the radial adjustment design, the ramp may be radially outward from the pendulum when deactivated and in the axial adjustment design, the ramp may be axially offset from the pendulum when deactivated. The ramp may be hydraulically adjusted, in one example, or electromagnetically adjusted, in another example.

FIG. 5 also shows the pendulum tuning mechanism 402 in a second tuning state. In the second tuning state, the locking pins 420 are retracted into the locking pin recesses 422 in the crankshaft section 408 causing the carrier 406 to move radially outward during crankshaft rotation. Thus, the locking pin devices 418 are decoupled from the carrier 406. In this way, the center of mass of the pendulum 404 is moved outward to dampen torque inputs from pistons in active cylinders, for example. The second tuning state in the pendulum tuning mechanism 402 may be activated in response a different engine order of a VDE engine. Both of these orders will allow the engine to lug at a lower speed without increased NVH to improve fuel economy.

FIG. 6 shows a side view of the pendulum tuning mechanism 402. The attachment pins 414 and slots 416 are depicted along with one of the locking pins 420. It will be understood that the attachment pins 414 are free to move radially within the slots 416 based on the configuration of the pins in the pin devices 418, shown in FIG. 5. Specifically, when the locking pins 420 are disengaged the attachment pins 414 radially move outward in the slots 416 due to the centrifugal force acting on the pendulum during crankshaft rotation. FIG. 6 also shows the carrier 406 and the crankshaft section 408 as well as one of the rolling pins 410.

In another embodiment, a hydraulic cylinder may be provided at the interface between the pendulum and the crankshaft section. In such an example, the hydraulic actuation assembly may be designed to vary fluid pressure in the hydraulic cylinder to vary the radial position of the pendulum with regard to the crankshaft section. For instance, the pendulum may be radially moved away from the crankshaft section when a pressure in the hydraulic cylinder is increased. Conversely, the pendulum may be radially retracted and moved toward the crankshaft section when the pressure in the hydraulic cylinder is decreased.

FIG. 7 shows another example of a pendulum tuning mechanism 700. The pendulum tuning mechanism 700 again includes a crankshaft section 702 and a carrier 704. It will be understood that a pendulum may be mounted on the carrier 704 in a similar manner to the previously described pendulum tuning mechanisms. Therefore, redundant description is omitted for brevity.

The pendulum tuning mechanism 700 includes rolling pins 706 residing in rolling pin recesses 708. The system further includes openings 710 (e.g., arcuate openings) residing in the carrier 704 which the rolling pins 706 adjustably engage. The rolling pins 706 may include stepped sections 711 and 713 (e.g., stepped rollers). The section 711 of the pins have a larger diameter than the section 713 of the pins. The rolling pins 706 may be axially adjustable to enable engagement of the larger diameter section 711 or the smaller diameter section 713 of the pins with the carrier openings 710. In this way, the motion of the pendulum may be adjusted to alter the tuning order of the pendulum. As such, the dynamics of the system are varied to enable the system to achieve different tuning orders.

The rolling pins 706 also include a tapered section 712 allowing the rolling pins 706 and the openings 710 to smoothly transition between the two tuning states. Although two stepped pin sections are shown in FIG. 7, it will be appreciated that additional stepped surfaces may be used, in other embodiments. The rolling pins 706 are moved longitudinally during the aforementioned tuning state transitions. A longitudinal axis 714 is provided in FIG. 7 for reference.

A first set of fluid lines 716 provide fluid to a first section of the rolling pin recesses 708. A second set of fluid lines 718 provide fluid to a second section of the rolling pin recesses 708. In this way, the pressurized fluid delivered to opposing sides of the rolling pins may be varied. The variation in the pressure on either side of the rolling pins allows the axial position of the rolling pins to be adjusted. For instance, when the pressure in the second set of fluid lines 718 is greater than the pressure in the first set of fluid lines the rolling pins 706 travel axially outward, engaging larger diameter sections of the rolling pin with the carrier opening 710. The tuning order depends on the size of the rolling pin. By switching from a larger diameter to a smaller diameter rolling pin section and vice versa the tuning order changes. Conversely, when the pressure in the first set of fluid lines 716 is greater than the second set of fluid lines 718 the rolling pins axially retract into the rolling pin recesses 708. Consequently, smaller diameter sections of the rolling pins are engaged with the carrier opening 710, resulting in a different tuning order.

FIGS. 8-9 show yet another example of a pendulum tuning mechanism 800. The pendulum tuning mechanism 800 includes multiple arcuate openings 802 and 804 in a pendulum 806. The arcuate openings 802 and 804 have different shapes, the opening 802 forming a longer arc than the opening 804. The pendulum tuning mechanism 800 also includes an adjustable rolling pin 808. The rolling pin 808 is axially adjustable (e.g., into and out of the page in the views shown in FIGS. 8-9). As such the rolling pin 808 may selectively engage either of the arcuate openings 802, 804. Again, the rolling pin 808 may be hydraulically adjusted. FIG. 8 specifically shows the rolling pin 808 engaged with the arcuate opening 802 while FIG. 9 shows the rolling pin engaged with the arcuate opening 804. Allowing the rolling pin to mate with either the smaller or the larger arcuate opening changes the path of the pendulum during crankshaft rotation. In this way, pendulum path may be adjusted to alter the tuning order of the pendulum tuning system. An adjustable ramp 810, similar to the other ramps described herein, may also be provided in the pendulum tuning mechanism 800 to allow the pendulum 806 to be pushed back toward the crank.

FIG. 12 illustrates an embodiment of a torque converter 1200 with a pendulum 1202 coupled to a rotational plate 1204 via a pin 1206. A pendulum tuning mechanism 1208 is schematically depicted in FIG. 12. However, it will be understood that the pendulum tuning mechanism has greater structural complexity than is capture in the FIG. 12 illustration. Thus, embodiments of the pendulum tuning mechanism 1208 employing the previously described pendulum mass adjustment, pendulum center of gravity adjustment, rolling pin diameter adjustment, and/or rolling pin path adjustment features, may be used for tuning order adjustment. For instance, hydraulically actuated and axially retractable pins (e.g., rolling pins or locking pins) mating with may be included in the rotational plate 1204.

FIGS. 1-9 and 12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 10 shows a method 1000 for operation of an engine system. The method 1000 may be carried out by the engine systems described above with regard to FIGS. 1-9. However, in other examples, the method 1000 may be implemented via other suitable engine systems. The method 1000 may be stored in non-transitory memory of a controller. Furthermore, the method 1000 may include instructions within a controller as well actions taken by the controller.

At 1002, the method includes determining operating conditions. The operating conditions may include engine speed, engine load, throttle position, pedal position, etc.

At 1004, the method includes determining whether to implement a transition between cylinder operation modes (a VDE mode and a non-VDE mode). In the VDE mode a portion of the cylinders may be deactivated while in the non-VDE mode all of the cylinders may be activated. Such a determination may be made based on changes in engine speed and/or engine load. For instance, if engine speed falls below a threshold value (e.g., 4000 revolutions per minute (RPM), 3500 RPM, 3000 RPM, 2500 RPM, etc.) the VDE mode may be slated for modal transition. Conversely, if the engine speed rises above the threshold speed the non-VDE mode may be slated for modal transition. In some examples, engine load may additionally or alternatively be used to determine if a modal transition is planned to occur. For instance, the VDE mode may be chosen when both engine speed and engine load are each below a threshold value. As such, if the engine speed and/or engine load fall below or surpass the threshold value(s) the method may determine a forthcoming modal transition (YES at 1004) ant the method proceed to 1006. However, in other examples, the VDE and non-VDE modes may be selected based on a driver input requesting modal adjustment or when engine components become degraded, for instance.

However, if the engine speed and/or engine load do not fall below or surpass their respective threshold value, the method determines that a modal transition will not be carried out (NO at 1004) and the method moves to 1008 where the engine's current operating strategy is maintained. For instance, the engine may maintain the current engine order and the associated cylinder activation/deactivation state.

At 1006, the method includes selecting the cylinder operation mode. As previously mentioned, the VDE mode may be selected when the engine speed and/or engine load fall below a respective threshold value. Alternatively, the VDE mode may be selected when valves or fuel injectors corresponding to a portion of the cylinders become degraded. Conversely, the non-VDE mode may be selected when the engine speed and/or engine load rise above a respective threshold value.

At 1010, the method includes transitioning to the non-VDE mode. Transitioning to the non-VDE mode may include steps 1012-1014. At 1012, the method includes activating the engine cylinders. For instance, intake and/or exhaust valves opening/closing along with fuel injection may be initiated in previously deactivated cylinders. At 1014, the method includes transitioning the pendulum tuning system into a first tuning state. To enter into the first tuning state, the center of gravity and/or the mass of one or more of the pendulums may be adjusted to dampen vibrations caused by the engine oscillating torque, in one example. In other examples, the tuning state of the pendulum tuning system may be adjusted by altering the diameter of the rolling pin mating with the arcuate opening in the pendulum and/or engaging an adjustable rolling pin with a differently sized arcuate opening in the pendulum. Therefore, when the number of active cylinders changes the engine order changes and the oscillating torque which the pendulums dampen are likewise changed.

At 1016, the method includes transitioning to the VDE mode. Transitioning to the VDE mode may include steps 1018-1020. At 1018, the method includes deactivating a portion of the cylinders. For instance, the intake and/or exhaust valves corresponding to a portion of the cylinders may be held closed. Additionally or alternatively, fuel injection and/or spark in the deactivated cylinders may be inhibited. In this way, combustion operation in the deactivated cylinders is suspended. At 1020, the method includes transitioning the pendulum tuning system into a second tuning state. To enter into the second tuning state, the pendulum center of gravity, the pendulum mass, the rolling pin diameter, and/or the rolling pin path, may be adjusted, as previously discussed. Method 1000 allows the damping provided by the engine system to be dynamically adjusted to account for changes in engine order caused by cylinder deactivation and reactivation. As a result, the engine oscillating torque can be dampened for different engine orders unlike other designs that can only dampen a single engine order, for example. Thus, the method 1000 allows engine fuel economy to be increased by reducing lug limit at different engine orders, without degraded NVH, for instance.

FIG. 11 shows a graphical embodiment of a control technique for a pendulum tuning system. In each graph time is indicated on the abscissa. Plot 1102 indicates the operational state (i.e., an "ON" and "OFF" state) of the VDE mode. As previously discussed, when VDE mode is operational, a portion of the cylinders in the engine are deactivated (e.g., combustion operation is suspended) and when the VDE mode is non-operational, all of the cylinders in the engine are activated. Plot 1104 indicates the pendulum tuning system's operational state (i.e., a first tuning state & a second tuning state). Plot 1106 indicates engine speed and an engine speed threshold triggering a VDE mode transition is indicated at 1108.

As shown, at t1 the engine speed falls below the threshold value 1108. Responsive to the engine speed falling below the threshold value the engine transitions to the VDE mode where a portion of the cylinders are deactivated and the pendulum tuning system is transitioned to the first tuning state. In the first tuning state, the pendulum's mass and/or center of gravity, roller size, or roller pin path is altered to account for the change in engine order caused by deactivation of the cylinders. For instance, pendulum damping mechanisms corresponding to the deactivated cylinders may be operated to decrease the mass and/or move the center of gravity of the pendulum closer to the rotational axis of the crankshaft to account for a different engine order.

The technical effect of providing a crankshaft with adjustable pendulum dampers is to decrease NVH across different engine orders. By reducing the oscillating torque at different engine orders the engine speed can be reduced at different engine orders.

The invention will be further described in the following paragraphs. In one aspect, an engine system is provided that comprises: a crankshaft coupled to a plurality of pistons in a plurality of cylinders, where the crankshaft comprises: a plurality of pendulums coupled to a plurality of cheeks; and a pendulum tuning mechanism coupled to an associated pendulum included in the plurality of pendulums or coupled to an associated pendulum included in a torque converter and configured to tune damping characteristics of the associated pendulum based on engine order.

In another aspect, an engine system is provided. The engine system includes a crankshaft coupled to a plurality of pistons in a plurality of cylinders; a plurality of pendulums coupled to the crankshaft, either directly or through an adjacent component; and a pendulum tuning mechanism coupled to an associated pendulum included in the plurality of pendulums and configured to tune damping characteristics of the associated pendulum based on engine order.

In another aspect, a method for operating an engine system is provided that comprises: operating a pendulum tuning mechanism coupled to an associated pendulum to adjust a tuning state of the associated pendulum based on a change in engine order of a plurality of cylinders; where associated pendulum is coupled to a cheek on a crankshaft or included in a torque converter or other component rotationally coupled to the crankshaft; and where the cheek is coupled to a crankpin coupled to a piston in one of the plurality of cylinders.

In yet another aspect, an engine system is provided that comprises: a crankshaft coupled to a plurality of pistons in a plurality of cylinders, where the crankshaft comprises: a plurality of pendulums coupled to a plurality of cheeks extending from crankpins; and a pendulum tuning mechanism coupled to a pendulum and configured to tune damping characteristics of the associated pendulum, where the pendulum is included in the plurality of pendulums in the crankshaft; a controller comprising: computer readable instructions stored on non-transitory memory that when executed during a cylinder deactivation transition, cause the controller to: operate the pendulum tuning mechanism to adjust a mass of the pendulum, a center of gravity of the pendulum, a rolling path of the pendulum, or a diameter of a rolling pin mated with an opening in the pendulum in responsive to an adjustment in engine order.

In any of the aspects or combinations of the aspects, the engine system may further comprise a controller with computer readable instructions stored on non-transitory memory that when executed during a cylinder deactivation condition, cause the controller to: operate the pendulum tuning mechanism to adjust the damping characteristics of the associated pendulum.

In any of the aspects or combinations of the aspects, the cylinder deactivation condition may include a condition where a portion of the plurality of cylinders are deactivated and the engine order is adjusted.

In any of the aspects or combinations of the aspects, the portion of the plurality of cylinders may be deactivated in response to a change in an engine speed and/or an engine load.

In any of the aspects or combinations of the aspects, the pendulum tuning mechanism may be configured to adjust a mass of the associated pendulum.

In any of the aspects or combinations of the aspects, the pendulum tuning mechanism may be configured to adjust a center of gravity of the associated pendulum with regard to a rotational axis of the crankshaft.

In any of the aspects or combinations of the aspects, the pendulum tuning mechanism may include a locking pin configured to, while in an engaged position, maintain a fixed radial distance between the crankshaft and a carrier.

In any of the aspects or combinations of the aspects, the locking pin may be configured for hydraulic actuation between the engaged position and a disengaged position.

In any of the aspects or combinations of the aspects, the pendulum tuning mechanism may be configured to change the rolling path for a different tuning order.

In any of the aspects or combinations of the aspects, the rolling pin can change in size to change the tuning order.

In any of the aspects or combinations of the aspects, operating the pendulum tuning mechanism may include operating the pendulum tuning mechanism with a first tuning state when a portion of the plurality of cylinders are deactivated and operating the pendulum tuning mechanism with a second tuning state different from the first tuning state when the portion of the plurality of cylinders are activated.

In any of the aspects or combinations of the aspects, adjusting the tuning state of the pendulum tuning mechanism may include adjusting a mass of one or more of the pendulum tuning mechanisms.

In any of the aspects or combinations of the aspects, adjusting the tuning state of the pendulum tuning mechanism may include adjusting a center of gravity of one or more of the pendulum tuning mechanisms.

In any of the aspects or combinations of the aspects, the pendulum tuning mechanism may be configured to adjust a center of gravity of the associated pendulum with regard to a rotational axis of the crankshaft.

In any of the aspects or combinations of the aspects, the pendulum tuning mechanism may be hydraulically adjustable.

In any of the aspects or combinations of the aspects, the adjustment in engine order may be initiated by deactivation of a portion of the plurality of cylinders.

In any of the aspects or combinations of the aspects, the pendulum tuning mechanism may be hydraulically adjusted.

In any of the aspects or combinations of the aspects, the pendulum tuning mechanism may include a locking pin configured to, while in an engaged position, maintain a fixed radial distance between the crankshaft and a carrier.

In any of the aspects or combinations of the aspects, the pendulum tuning mechanism may be configured to adjust a mass of the associated pendulum to tune the dampening characteristics.

In any of the aspects or combinations of the aspects, the pendulum tuning mechanism may be configured to adjust a diameter of a rolling pin attaching the associated pendulum to a carrier to tune the dampening characteristics.

In any of the aspects or combinations of the aspects, the pendulum tuning mechanism may include two distinct arcuate openings with an adjustable rolling pin configured to selectively engage the two distinct arcuate openings to tune the dampening characteristics via rolling pin path adjustment.

In any of the aspects or combinations of the aspects, adjusting the tuning state of the pendulum tuning mechanism may include adjusting a diameter of a rolling pin attaching the associated pendulum to a carrier.

In any of the aspects or combinations of the aspects, adjusting the tuning state of the pendulum tuning mechanism may include engaging one of a plurality of distinct arcuate openings in the associated pendulum with an adjustable rolling pin.

In another representation, a crankshaft damping system is provided that includes an adjustable pendulum coupled to a side of a crankshaft opposing a crankpin coupled to a piston in a cylinder, where the adjustable pendulum is designed to adjust a mass and/or a center of gravity of the adjustable pendulum responsive to transitions between a partial cylinder deactivation mode and a full cylinder activation mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range unless otherwise specified. Engine order is not a percent The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system comprising:
a crankshaft coupled to a plurality of pistons in a plurality of cylinders;
a plurality of pendulums coupled to the crankshaft, either directly or through an adjacent component; and
a pendulum tuning mechanism coupled to an associated pendulum included in the plurality of pendulums and configured to tune damping characteristics of the associated pendulum based on engine order.

2. The engine system of claim 1, further comprising a controller with computer readable instructions stored on non-transitory memory that when executed during a cylinder deactivation condition, cause the controller to:
operate the pendulum tuning mechanism to adjust the damping characteristics of the associated pendulum.

3. The engine system of claim 2, where the cylinder deactivation condition includes a condition where a portion of the plurality of cylinders are deactivated and the engine order is adjusted.

4. The engine system of claim 3, where the portion of the plurality of cylinders are deactivated in response to a change in an engine speed and/or an engine load.

5. The engine system of claim 1, where the pendulum tuning mechanism is configured to adjust a mass of the associated pendulum to tune the dampening characteristics.

6. The engine system of claim 1, where the pendulum tuning mechanism is configured to adjust a diameter of a rolling pin attaching the associated pendulum to a carrier to tune the dampening characteristics.

7. The engine system of claim 1, where the pendulum tuning mechanism is configured to adjust a center of gravity of the associated pendulum with regard to a rotational axis of the crankshaft.

8. The engine system of claim 7, where the pendulum tuning mechanism includes a locking pin configured to, while in an engaged position, maintain a fixed radial distance between the crankshaft and a carrier.

9. The engine system of claim 8, where the locking pin is configured for hydraulic actuation between the engaged position and a disengaged position.

10. The engine system of claim 1, where the pendulum tuning mechanism includes two distinct arcuate openings with an adjustable rolling pin configured to selectively engage the two distinct arcuate openings to tune the dampening characteristics via rolling pin path adjustment.

11. A method for operating an engine system, comprising:
operating a pendulum tuning mechanism coupled to an associated pendulum to adjust a tuning state of the associated pendulum based on a change in engine order of a plurality of cylinders;
where associated pendulum is coupled to a cheek on a crankshaft or included in a torque converter or other component rotationally coupled to the crankshaft; and
where the cheek is coupled to a crankpin coupled to a piston in one of the plurality of cylinders.

12. The method of claim 11, where operating the pendulum tuning mechanism includes operating the pendulum tuning mechanism with a first tuning state when a portion of the plurality of cylinders are deactivated and operating the pendulum tuning mechanism with a second tuning state different from the first tuning state when the portion of the plurality of cylinders are activated.

13. The method of claim 11, where adjusting the tuning state of the pendulum tuning mechanism includes adjusting a mass of one or more of the pendulum tuning mechanisms.

14. The method of claim 11, where adjusting the tuning state of the pendulum tuning mechanism includes adjusting a center of gravity of one or more of the pendulum tuning mechanisms.

15. The method of claim 11, where adjusting the tuning state of the pendulum tuning mechanism includes adjusting a diameter of a rolling pin attaching the associated pendulum to a carrier.

16. The method of claim 11, where adjusting the tuning state of the pendulum tuning mechanism includes engaging one of a plurality of distinct arcuate openings in the associated pendulum with an adjustable rolling pin.

17. An engine system comprising:
a crankshaft coupled to a plurality of pistons in a plurality of cylinders;
a plurality of pendulums coupled to the crankshaft, either directly or through an adjacent component; and
a pendulum tuning mechanism coupled to a pendulum and configured to tune damping characteristics of the associated pendulum, where the pendulum is included in the plurality of pendulums;
a controller comprising:
computer readable instructions stored on non-transitory memory that when executed during a cylinder deactivation transition, cause the controller to:
operate the pendulum tuning mechanism to adjust a mass of the pendulum, a center of gravity of the pendulum, a rolling path of the pendulum, or a diameter of a rolling pin mated with an opening in the pendulum in responsive to an adjustment in engine order.

18. The engine system of claim 17, where the adjustment in the engine order is initiated by deactivation or reactivation of a portion of the plurality of cylinders.

19. The engine system of claim 17, where the pendulum tuning mechanism is hydraulically adjusted.

20. The engine system of claim 17, where the pendulum tuning mechanism includes a locking pin configured to, while in an engaged position, maintain a fixed radial distance between the crankshaft and a carrier.

* * * * *